United States Patent
Yu

[11] Patent Number: 5,932,140
[45] Date of Patent: Aug. 3, 1999

[54] PHOSPHOR HAVING IMPROVED LUMINESCENSE EFFICIENCY AND A PROCESS FOR PREPARING THE SAME

[75] Inventor: Il Yu, Kyungki-do, Rep. of Korea

[73] Assignee: Samsung Display Devices Co., Ltd., Kyungki-do, Rep. of Korea

[21] Appl. No.: 08/996,108

[22] Filed: Dec. 22, 1997

[30] Foreign Application Priority Data

Jun. 5, 1997 [KR] Rep. of Korea ............ 97-23441

[51] Int. Cl.$^6$ ............ C09K 11/02; C09K 11/54; B05D 5/06
[52] U.S. Cl. ............ 252/301.6 S; 252/301.4 R; 252/301.6 R; 427/64; 427/383.3; 427/226; 427/215
[58] Field of Search ............ 427/64, 226, 383.3, 427/215; 252/301.4 R, 301.6 R, 301.4 S

[56] References Cited

U.S. PATENT DOCUMENTS

| 494,707 | 8/1893 | Kasenga et al. | 427/64 |
| 5,196,229 | 3/1993 | Chau | 427/64 |
| 5,246,781 | 9/1993 | Jeong | 427/64 |
| 5,258,201 | 11/1993 | Munn et al. | 427/64 |
| 5,369,331 | 11/1994 | Mizukami et al. | 427/64 |
| 5,382,452 | 1/1995 | Bruno et al. | 427/64 |

*Primary Examiner*—Janyce Bell
*Attorney, Agent, or Firm*—Christie, Parker & Hale, LLP

[57] ABSTRACT

A phosphor for a low voltage display device having a host and a metal salt or metal oxide dispersed on the surface of the host with improved luminescence efficiency which can be prepared at a low temperature.

12 Claims, 1 Drawing Sheet

PHOSPHOR HAVING IMPROVED LUMINESCENSE EFFICIENCY AND A PROCESS FOR PREPARING THE SAME

BACKGROUND OF THE INVENTION

1. Field of the Invention

The present invention relates to a phosphor, and more particularly, to a phosphor having improved luminescence efficiency and a process for preparing the same by uniformly dispersing activators on the surface of a host.

2. Description of the Related Art

In general, FEDs (Field Emission Displays), VFDs (Vacuum Fluorescent Displays), etc. are used as low voltage display devices in which a driving voltage below 1 kV is used. The FED has been widely studied for use as a small flat display device. The VFD is typically used a display device for panels of various home application apparatuses, such as video cassette recorders, microwave ovens, etc., and is also used as a display device for panels of automobiles. In low voltage display devices, the electrons are irradiated from an electron-emitter such as a hot-wire, and the irradiated electrons activate phosphors on the screen of the display device to reproduce graphic images.

Conventionally, the phosphor includes a host, as a main component, and an activator. ZnS, (ZnCd)S, $Y_2O_3$, or $Y_2O_2S$ are generally used as the host, and various kinds of metals are used as the activator. When ZnS is used as the host, the activators are doped on the host by a thermal diffusion method at 900 to 1000° C. Conversely, when $Y_2O_3$ is used as the host, the activators are doped on the host at higher temperatures of 1200 to 1300° C. The activators of the phosphors produced by the above-described conventional methods are uniformly dispersed into the host as shown in FIG. 1. Thus, all activators in the phosphor affect the luminescence of the phosphor only when a high energy electron beam is irradiated to the phosphor in a high voltage display device, such as a cathode ray tube.

In a low voltage display device, an electron beam, which is irradiated from a hot-wire, penetrates into the phosphor by only a few Å from the surface of the host. Therefore, only the activators on the peripheral of the phosphor affect the luminescence efficiency of the phosphor. Therefore, the luminescence of a phosphor of a low voltage display device greatly depends on the activators on the surface of the phosphor. Accordingly, in the case of preparing phosphors for the low voltage display device, if the activators are doped on the host by the conventional thermal diffusion method, the phosphor has poor luminescence due to the dispersion of the activators. Additionally, since the host and the activators are heated at higher temperatures of 900 to 1300° C. to diffuse and crystallize the activators in the host, the production cost of the phosphor may be increased.

SUMMARY OF THE INVENTION

To resolve the above problems, an embodiment of the present invention provides a phosphor having an improved luminescence efficiency and a process for preparing the same at a comparatively low temperature. Additional objects, advantages and novel features of the invention will be apparent to those skilled in the art upon examination of the following detailed description or may be learned by practice of the invention.

To achieve the above objects, an embodiment of the present invention provides a process for preparing a phosphor for a low voltage display device. The process includes the steps of coating a metal salt or a metal oxide on a host, and doping the metal salt or the metal oxide into the host by heating the host at 400 to 800° C. This results in a phosphor for a low voltage display device having a metal salt or a metal oxide dispersed on the surface of the host.

In the following detailed description, only the preferred embodiment of the invention has been shown and described, simply by way of illustration of the best mode contemplated by the inventor(s) of carrying out the invention. As will be realized, the invention is capable of modification in various other respects, all without departing from the invention. Accordingly, the description is to be regarded as illustrative in nature, and not as restrictive.

DETAILED DESCRIPTION OF THE PREFERRED EMBODIMENTS

Figure 1:
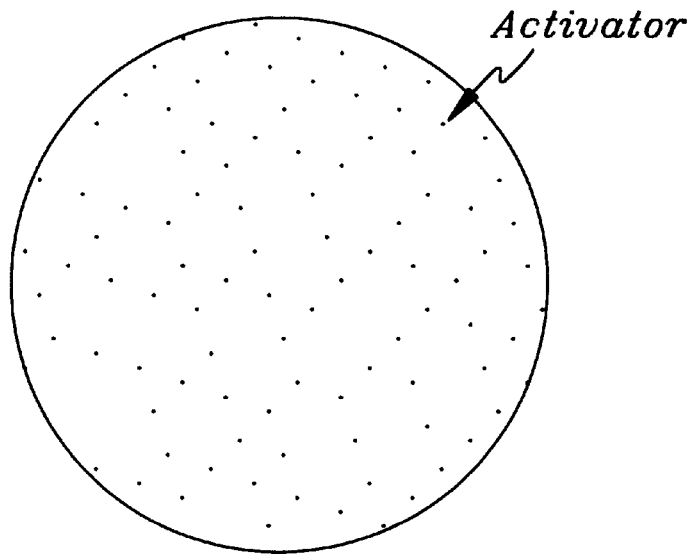
FIG. 1 is a cross-sectional view of the conventional phosphor which shows the uniform distribution of the activators in the phosphor.
Figure 2:
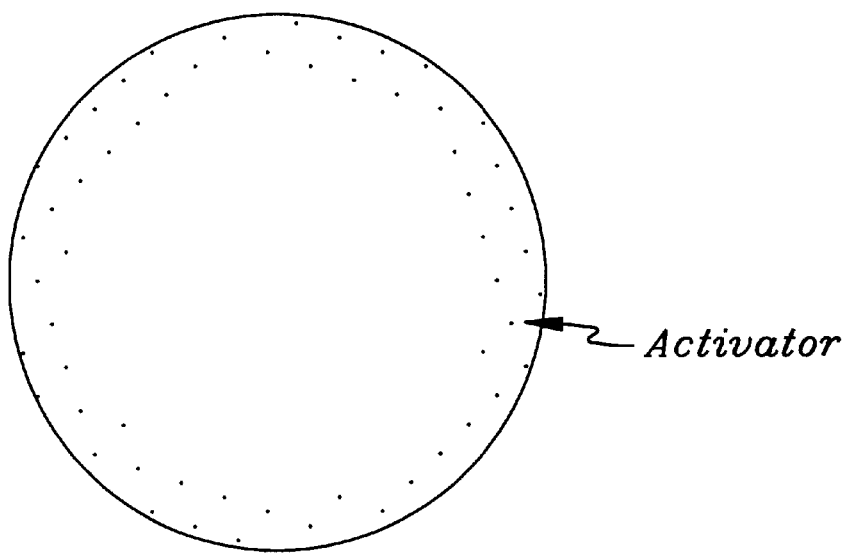
FIG. 2 is a cross-sectional view of the phosphor for a low voltage display device according to an embodiment of the present invention which shows the distribution of the activators in the phosphor.

An embodiment of the present invention is a process for preparing a phosphor for a low voltage display device. The process includes the steps of coating a metal salt or a metal oxide on a host, and doping the metal salt or the metal oxide into the host by heating the host at 400 to 800° C. This results in a phosphor for a low voltage display device having a metal salt or a metal oxide dispersed on the surface of the host as shown in FIG. 2.

It is preferable that the metal is selected from manganese (Mn), copper (Cu), gold (Au), silver (Ag), europlum (Eu), samarium (Sm), dysprosium (Dy), cerium (Ce), terbium (Tb) or a mixture thereof, and the host is ZnS, (ZnCd)S, $Y_2O_3$, or $Y_2O_2S$. It is also preferable that the coating of the metal salt or metal oxide is coated on the surface of the host in the presence of an aqueous solution or an alcoholic solution. The coated activators are doped and diffused into the host by a thermal treatment at the temperature of 400 to 800° C. If the temperature of the thermal treatment is below 400° C., the phosphor will have poor luminescence. If the thermal treatment temperature is over 800° C., the activators are needlessly doped into the deep portions of the host, resulting in deteriorated luminescence efficiency as well as wasted power consumption.

Preferable examples and reference example are described below. These examples are exemplary only, and the present invention is not restricted to the scope of the examples.

EXAMPLE 1

Purified water as a solvent, ZnS powder as a host material, and an aqueous solution of a manganese salt as an activator were mixed in a 250 ml beaker to coat the manganese salt on the surface of the ZnS host. The coated activator was diffused and doped into the host by a thermal treatment at 500° C. for 1 hour to produce a phosphor for a low voltage display device. The amount of the manganese salt in the phosphor was 1% by weight.

EXAMPLE 2

Purified water as a solvent, $Y_2O_3$ powder as a host material, and an aqueous solution of a manganese salt as an activator were mixed in a 250 ml beaker to coat the manganese salt on the surface of the $Y_2O_3$ host. The coated activator was diffused and doped into the host by a thermal treatment at 500° C. for 1 hour to produce a phosphor for a low voltage display device. The amount of the manganese salt in the phosphor was 1% by weight.

REFERENCE EXAMPLE 1

ZnS powder as a host was mixed with a manganese salt to coat the manganese salt on the host. Then the coated host is heated at 900° C. for 2 hours to dope the manganese salt into the host. The amount of the manganese salt in the phosphor was 1% by weight.

REFERENCE EXAMPLE 2

$Y_2O_3$ powder as a host was mixed with a manganese salt to coat the manganese salt on the host. Then the coated host is heated at 1250° C. for 2 hours to dope the manganese salt into the host. The amount of the manganese salt in the phosphor was 1% by weight.

The luminescence efficiency of the phosphors prepared by the above Examples are listed in following Table 1.

TABLE 1

|  | Phosphor Material | Doping Temperature (° C.) | Relative Luminescence Efficiency |
|---|---|---|---|
| Example 1 | ZnS | 500 | 110 |
| Example 2 | $Y_2O_3$ | 500 | 105 |
| Reference Example 1 | ZnS | 900 | 100 |
| Reference Example 2 | $Y_2O_3$ | 1250 | 100 |

As shown in the Table 1, the phosphors of the Examples show improved luminescence efficiency by 5 to 10% than that of the Reference Examples even though the phosphors of the Examples were produced at a comparatively low temperature.

In this disclosure, there is shown and described only the preferred embodiment of the invention, but, as aforementioned, it is to be understood that the invention is capable of use in various other combination and environments and is capable of changes or modification within the scope of the inventive concepts as expressed herein.

What is claimed is:

1. A process for preparing a phosphor for a low voltage display device, comprising the steps of:

coating a metal salt or a metal oxide on a host, wherein the host is selected from the group consisting of ZnS, (ZnCd)S, $Y_2O_3$, and $Y_2O_2S$; and doping the metal salt or the metal oxide into the host by heating the host at a temperature of about 400 to 800° C.

2. The process of claim 1 wherein the metal is selected from the group consisting of Mn, Cu, Au, Ag, Eu, Sm, Dy, Ce, Tb and mixture thereof.

3. The process of claim 1 wherein the step of coating is performed in an aqueous solution or an alcoholic solution.

4. A phosphor for a low voltage display device, comprising:

a host having substantially no activators dispersed below an area proximal to a surface of said host; and a metal salt or a metal oxide dispersed in the host, said metal salt or metal oxide being concentrated in said proximal area to the surface of said host.

5. The phosphor of claim 4 wherein the metal is selected from the group consisting of Mn, Cu, Au, Ag, Eu, Sm, Dy, Ce, Tb and mixture thereof.

6. A process for preparing a phosphor according to claim 4, comprising the steps of:

coating the metal salt or metal oxide on the host; and doping the metal salt or metal oxide into the host by heating the host at a temperature of about 400 to 800° C.

7. The process of claim 6 wherein the host is selected from the group consisting of ZnS, (ZnCd)S, $Y_2O_3$ and $Y_2O_2S$.

8. The process of claim 6 wherein the metal is selected from the group consisting of Mn, Cu, Au, Ag, Eu, Sm, Dy, Ce, Tb and mixtures thereof.

9. The process of claim 8 wherein the step of coating is performed in an aqueous solution or an alcoholic solution.

10. The phosphor of claim 4 wherein the host is selected from the group consisting of ZnS, (ZnCd)S, $Y_2O_3$ and $Y_2O_2S$.

11. A process for preparing a phosphor for a low voltage display device, comprising the steps of:

coating, in an aqueous or alcoholic solution, a metal salt or a metal oxide on a host; and doping the metal salt or the metal oxide into the host by heating the host at a temperature of about 400 to 800° C.

12. A process for preparing a phosphor for a low voltage display device, comprising the steps of:

coating a metal salt or a metal oxide on a host, wherein the metal is selected from the group consisting of Mn, Cu, Au, Ag, Eu, Sm, Dy, Ce, Tb and mixtures thereof; and doping the metal salt or the metal oxide into the host by heating the host at a temperature of about 400 to 800° C.

* * * * *